United States Patent [19]
Thomsen et al.

[11] Patent Number: 4,725,354
[45] Date of Patent: * Feb. 16, 1988

[54] FILTERING SYSTEM

[75] Inventors: Jack W. Thomsen, La Grange Park; John W. Tadlock, West Chicago, both of Ill.

[73] Assignee: Everpure, Inc., Westmont, Ill.

[*] Notice: The portion of the term of this patent subsequent to Mar. 31, 2004 has been disclaimed.

[21] Appl. No.: 837,197

[22] Filed: Mar. 7, 1986

[51] Int. Cl.$^4$ .................. B01D 27/02; B01D 27/08
[52] U.S. Cl. ................................ 210/232; 210/249; 210/282; 210/440; 210/444; 210/472
[58] Field of Search ............. 210/232, 238, 249, 250, 210/282, 440, 443, 444, 450, 455, 472

[56] References Cited
U.S. PATENT DOCUMENTS

| | | | |
|---|---|---|---|
| 2,647,871 | 8/1953 | Frazier | 210/282 |
| 3,785,164 | 1/1974 | Wrenn | 210/282 |
| 3,819,055 | 6/1974 | Skinner | 210/232 |
| 3,935,106 | 1/1976 | Lipner | 210/232 |
| 4,133,763 | 1/1979 | Cooper | 210/232 |
| 4,591,438 | 5/1986 | Tanabe | 210/282 |

Primary Examiner—Ernest G. Therkorn
Attorney, Agent, or Firm—Frank R. Thienpont

[57] ABSTRACT

A filtering system for water treatment including a head member having fluid inlet and outlet ports, a bracket member adapted to be secured to stationary support means, the head member being secured to the bracket member, a disposable filter cartridge closed at one end and being equipped at its other end with a closure member, the closure member having inlet and outlet passages formed therein to communicate with the interior of said filter cartridge, the closure member portion of the filter cartridge being insertable into the head member, its inlet and outlet passages formed so as to communicate with the inlet and outlet ports in the head member, the closure member being adapted for easy insertion into and withdrawal from the head member.

25 Claims, 12 Drawing Figures

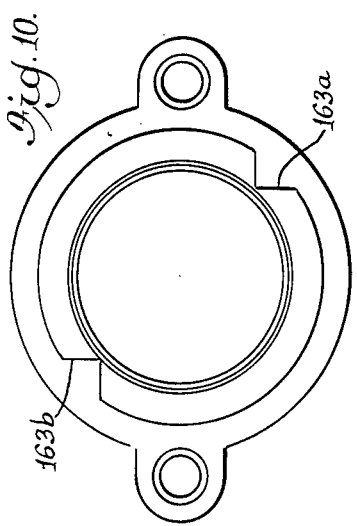
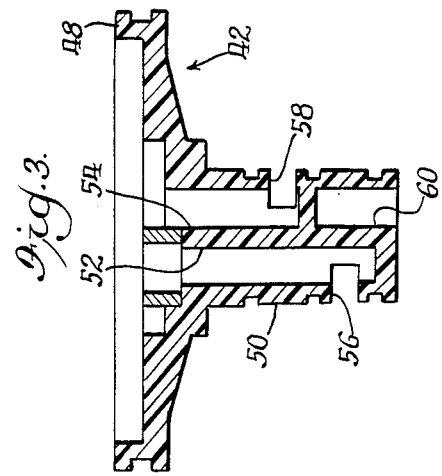
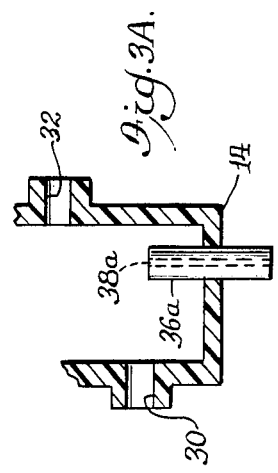
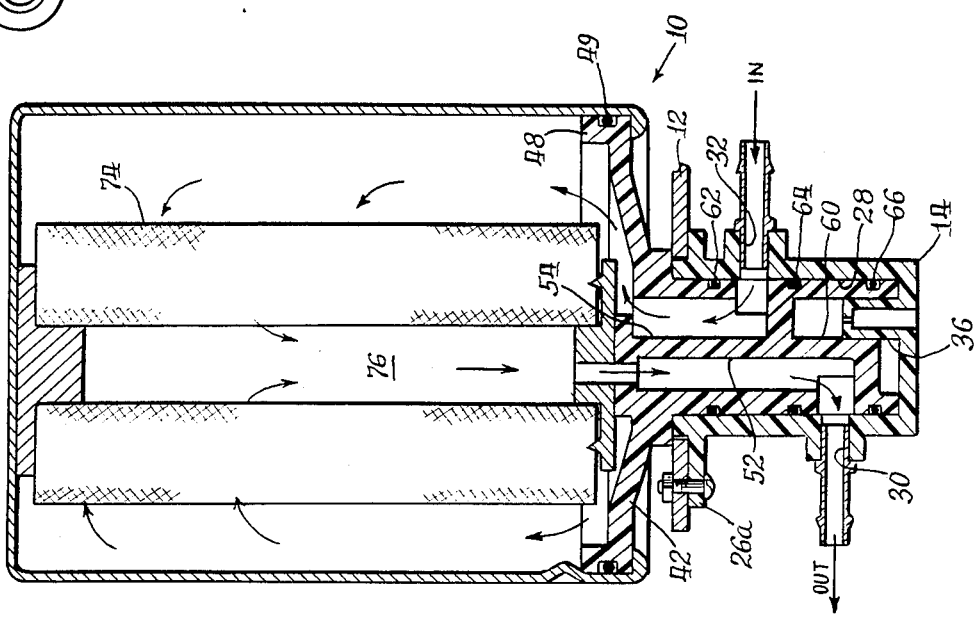
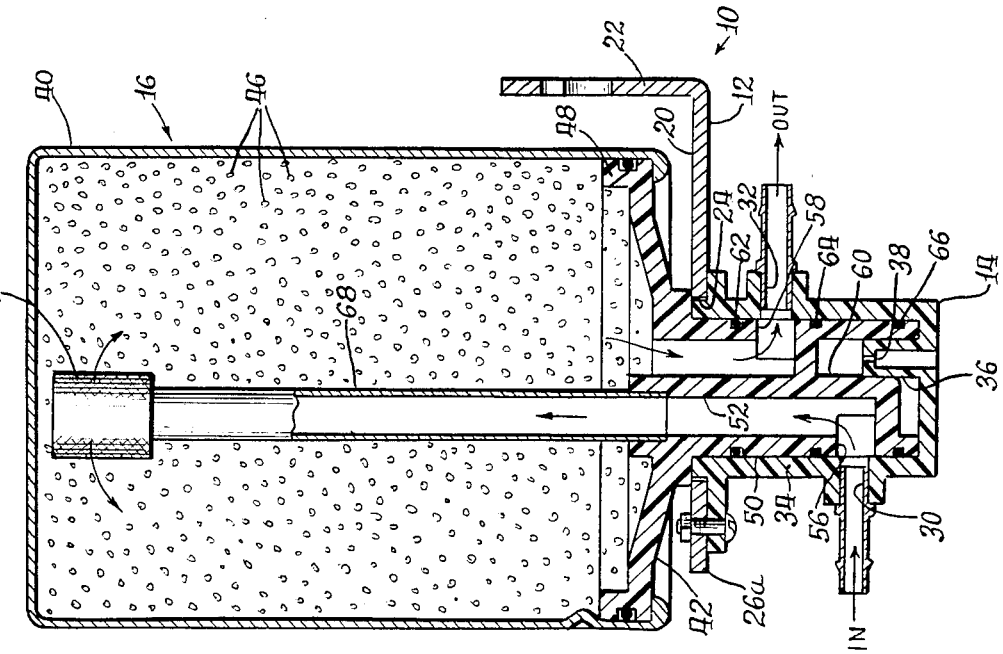

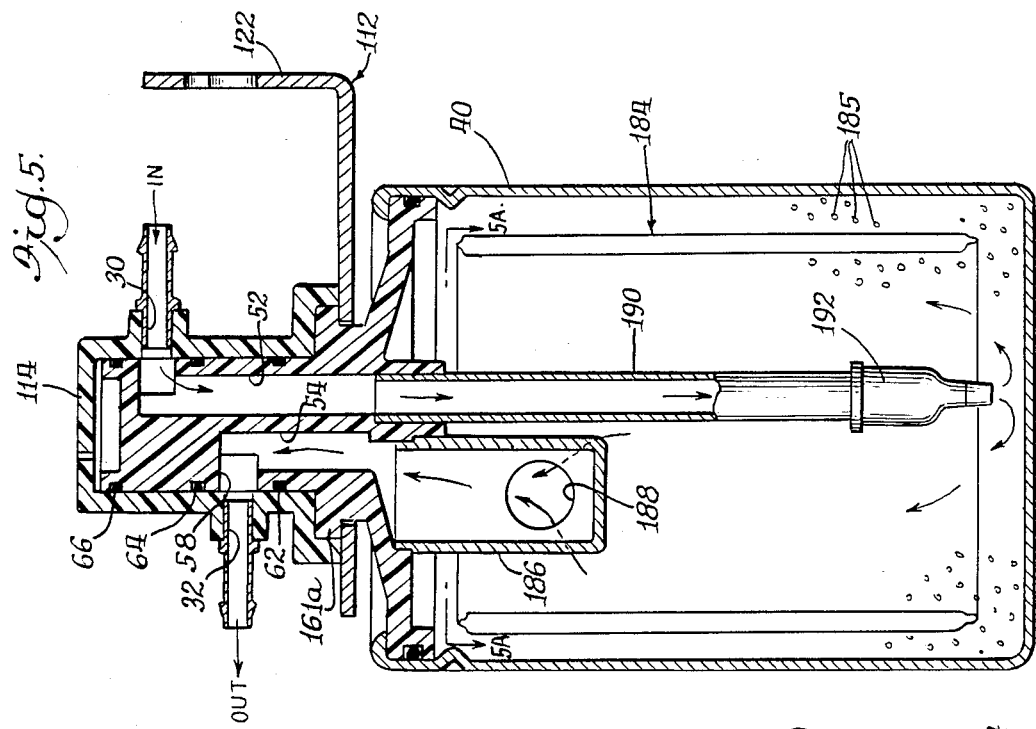
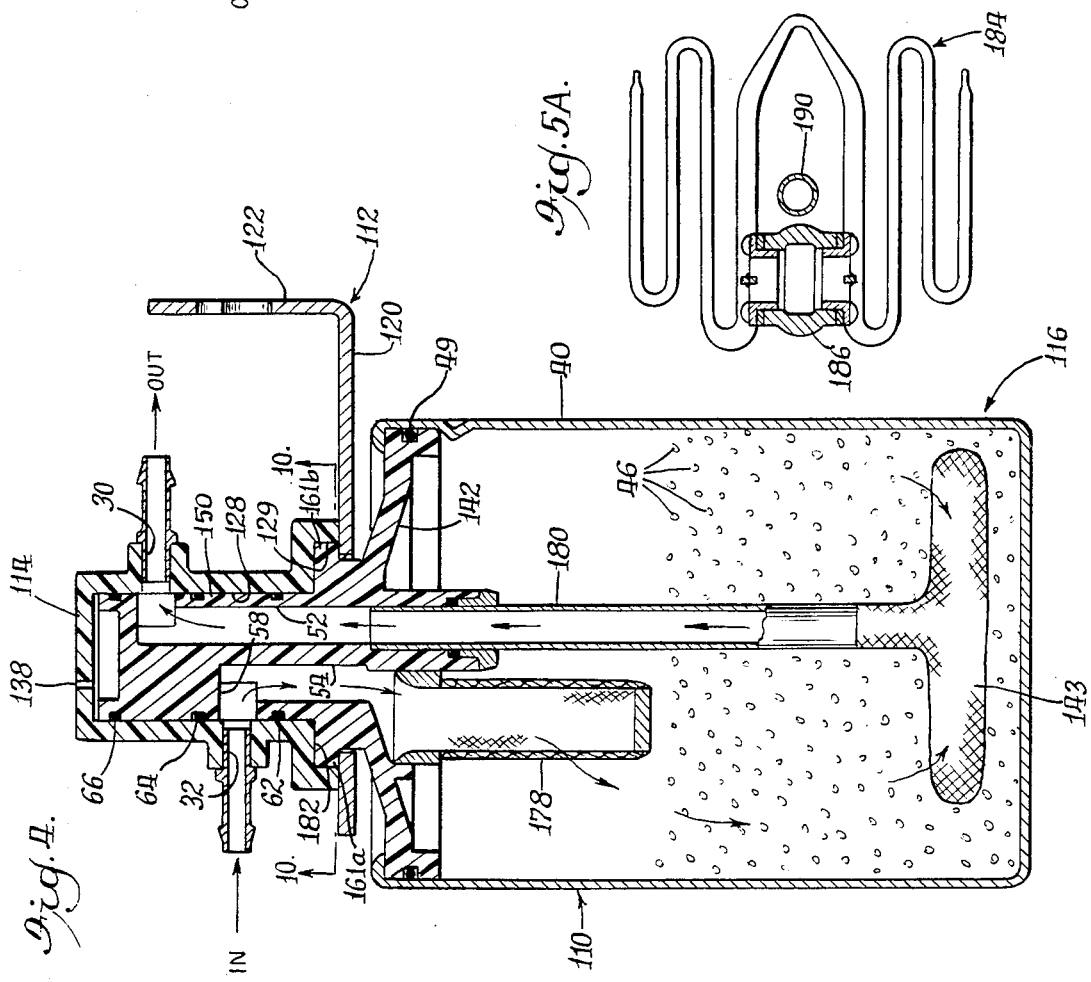

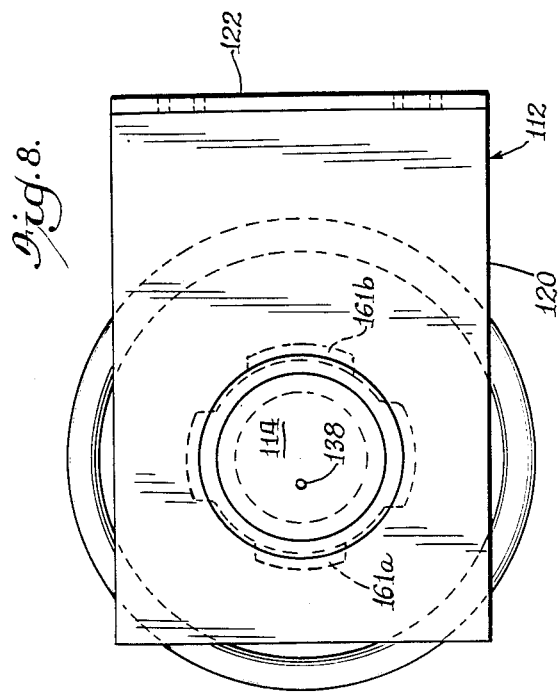
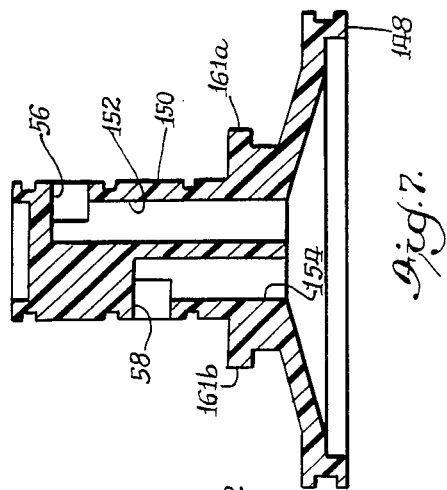
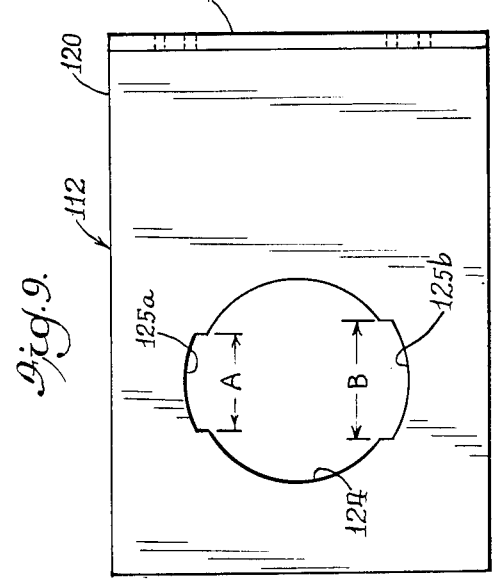
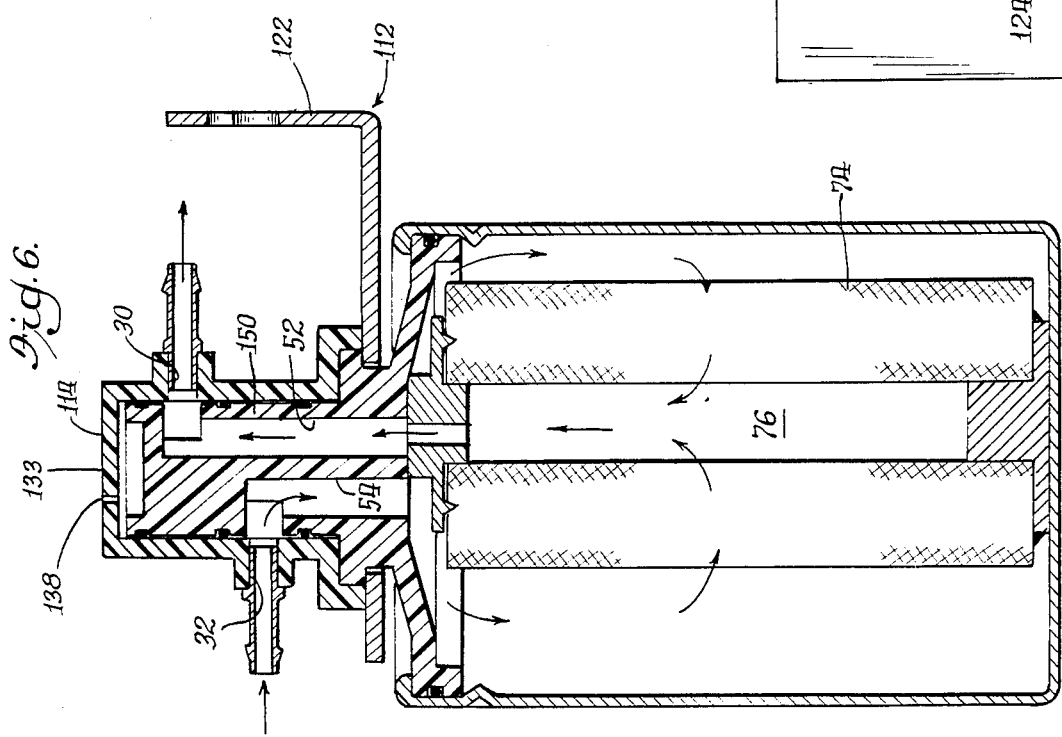

FILTERING SYSTEM

BACKGROUND OF THE INVENTION

This invention relates to a filtering system and more particularly to a system in which a disposable filter cartridge can be inserted into and removed from a head member which is permanently mounted in a fluid conduit.

SUMMARY OF THE INVENTION

An object of the invention is to provide in a water treatment system a convenient economical filter assembly wherein a disposable filter cartridge can easily be installed in the line by hand without the use of cumbersome extra tools.

A further object of the invention is to provide a filter assembly including an integral disposable filter unit constructed and arranged in such manner that line pressure will not be effective to dislodge the filter unit from the head member.

Other objects and advantages of the invention will become more apparent from the following description and accompanying drawings.

BRIEF DESCRIPTION OF THE DRAWINGS

FIG. 1 is a sectional view in elevation of a filter assembly embodying the invention herein in an assembled position;

FIG. 2 is a sectional view in elevation of another filter assembly embodying the invention but using a different filter means in the filter cartridge;

FIG. 3 is a sectional view in elevation of the closure member of the type fitted in the open end of a pressure vessel as shown in FIGS. 1 and 2;

FIG. 3A is a partial sectional view of the head member of FIGS. 1 and 2 illustrating an alternative venting construction;

FIG. 4 is a sectional view in elevation of a filter assembly embodying the invention in an assembled position and showing the filter cartridge in a hanging position as distinguished from the inverted position of FIGS. 1 and 2;

FIG. 5 is a sectional view in elevation of a filter assembly similar to that shown in FIG. 4 embodying the invention but using a different filter means in the filter cartridge;

FIG. 5A is a plan view taken along line 5A—5A of FIG. 5;

FIG. 6 is a sectional view in elevation of a filter assembly similar to that shown in FIG. 4 embodying the invention but using a filter means similar to that shown in FIG. 2;

FIG. 7 is a sectional view in elevation of the closure member of the type fitted in the open end of a pressure vessel as shown in FIGS. 4, 5, and 6;

FIG. 8 is a plan view of the filter assembly of FIG. 6;

FIG. 9 is a plan view of the bracket member as shown in FIG. 8; and

FIG. 10 is a bottom plan view of the head member taken along line 10—10 of FIG. 4.

DESCRIPTION OF PREFERRED EMBODIMENTS

Referring now to the drawings wherein like reference characters refer to like parts the filter assembly 10 as shown in FIG. 1 includes a bracket member 12 for supporting a head member and a filter cartridge, a head member 14 secured to the bracket member and a filter cartridge 16 which is inserted into and supported in the head member.

The bracket member 12 includes a generally laterally extending plate-like portion 20 with a substantially vertically extending integral portion 22 which may be removably attached to a supporting structure by suitable fastening means.

A circular opening 24 is formed in the laterally extending portion 20 for receiving therethrough the end of the filter cartridge.

The head member 14, preferably of a molded plastic, is a cylindrical cup-like structure which may be formed with a pair of oppositely disposed flanges 26a and 26b (not shown) by which it is secured to the bracket member. In the embodiments of both FIGS. 1 and 2 the head member 14 is shown with the opening to the head member facing upwardly so that a filter cartridge is inserted in an upside down position downwardly through opening 24 in the bracket member and into the head member 14. FIGS. 4, 5, and 6 by contrast show the filter cartridge supported in a hanging or upright position similar to that shown in our copending U.S. Pat. application Ser. No. 798,948 on a Filtering System filed Nov. 18, 1985.

A bore 28 is formed in the head member 14 for receiving the lower end of filter cartridge 16 therein. A pair of ports 30 and 32, one an inlet and the other an outlet, are formed in the cylindrical wall 34 of the head member. In the embodiment shown in FIG. 1, 30 is the inlet port, and 32 is the outlet port although these may be reversed depending on the type of filter arrangement within the pressure vessel, such as the different filter arrangement in FIG. 2 as will be subsequently described in connection with the description of FIG. 2. Appropriate connections made to these ports 30 and 32 is what incorporates the filter assembly into a fluid conduit which provides the water to the unit or device which ultimately uses the filtered or treated water.

At its lower end as seen in FIG. 1 the head member 14 is formed with an internally directed axially extending tubular alignment projection 36 offset from the bore axis which is intended to be received by a mating bore in the closure member of the filter cartridge. A vent hole 38 is formed in the end of the tubular alignment projection to vent air or any fluid that may have collected in the bore 28 for one reason or another such, for example, as during filter cartridge replacement activity.

Instead of the integral projection 36 formed on the end wall of the head member a pin 36a may be positioned in an opening formed in the end wall of the head member as shown in FIG. 3A. The pin would be formed with a vent opening 38a and be received in the bore 60.

The filter cartridge 16 of FIG. 1 includes a pressure vessel 40, a closure member 42, and a filter media 46. The filter cartridge is designed as an integral disposable unit which may be easily inserted into and removed from the head member 14 without the use of special tools.

The pressure vessel 40 which may be of metal or plastic is closed at its upper end as shown in FIGS. 1 and 2, and the closure member 42 is sealingly permanently fitted into the open end of the pressure vessel by appropriate means.

The closure member 42 of FIGS. 1, 2, and 3 which preferably is made of a plastic material includes an annular base portion 48, which is the portion secured into the open end of the pressure vessel, and is sealingly fitted into the open end with a seal means 49. The closure member includes an elongated generally cylindrical portion 50 formed integrally with the base portion. The cylindrical portion 50 is inserted into the head member 14 in the assembly.

A pair of substantially axially extending fluid inlet and outlet passages 52 and 54 are formed in the elongated cylindrical portion 50 of the closure member and as shown in FIG. 1, 52 is the inlet passage and 54 is the outlet passage. A fluid port 56 is formed in the cylindrical sidewall of the cylindrical portion 50 in communication with passage 52. Another fluid port 58 is formed in the cylindrical sidewall of the cylindrical portion 50 in communication with passage 54 and in axially spaced relation with fluid port 56. In the assembly of FIG. 1 fluid port 56 communicates with inlet port 30 formed in head member 14 and fluid port 58 communicates with outlet port 32 formed in head member 14. A bore 60 is formed in the lower end of closure member 42 and as previously noted is adapted to receive alignment projection 36 of the head member 14 to thus align in the assembly the inlet and outlet ports 56 and 58 of the closure member 42 with the inlet and outlet ports 30 and 32 of the head member 14. The vent hole 38 in the alignment projection 36 is effective to vent from the head member 14 any fluid that may collect in the head member.

O-ring seals 62, 64, and 66 are disposed on the outer cylindrical surface of the cylindrical portion 50 of the closure member. The O-ring seal 64 is disposed at a point on the closure member so that inlet fluid entering inlet port 30 will be sealed off from outlet fluid exiting through outlet port 32. O-ring seal 66 is effective to prevent the leakage of inlet fluid to the outside through vent hole 38. O-ring seal 62 is effective to prevent the leakage of filtered fluid to the outside.

With the type of construction as illustrated the fluid pressure around the cylindrical portion of the closure member 42 at both the inlet and outlet is acting in radial planes between the O-ring seals. There is, therefore, no axial pressure as in a piston which might tend to force disengagement between the closure member 42 and the head member 14.

The filter cartridge 16 as shown in FIG. 1 includes an inlet tube 68 which is connected to inlet passage 52 of the closure member in a suitable manner. The inlet tube 68 extends to near the top of the pressure vessel 40 and carries at its upper end a tubular screen strainer 70. In this particular embodiment the pressure vessel contains a filter media 46 which may substantially fill up the entire pressure vessel. The filter media preferably is a granular activated carbon. Influent liquid entering the inlet 30 moves through inlet tube 68 and screen strainer 70, into and through the filter media 46 and out of the pressure vessel via outlet passage 54 and fluid outlet 58.

Insertion and removal of the integral disposable filter unit is done with ease and without the necessity of extra tools such as wrenches, etc. In this essentially inverted position gravity is effective to hold the filter cartridge in its normal operating position in the head member 14, the weight of the filter cartridge being sufficient to maintain the filter cartridge and head member in an operable relationship. The cooperating alignment means on the head member and the closure member, namely the alignment pin 36 and mating bore 60, make it easy to positively align the inlet and outlet ports in the head member and closure member.

The embodiment shown in FIG. 2 differs from the FIG. 1 embodiment in that a different filter means is used in the pressure vessel. This difference in filter means then makes it necessary to reverse the flow of liquid through the head member and closure member. In FIG. 2 a cylindrical filter unit 74 is used. It is formed with a central passage 76 closed at its upper end. The passage 76 is aligned with passage 52 in the closure member 42. The unit 74 may be a string wound filter or a spun bonded unit. In this case the influent water enters through port 32, moves through passage 54 as indicated by the arrows, into the pressure vessel 40, passes radially inwardly through the filter unit 74 to the center thereof into central passage 76 and out through passage 52 and outlet port 30.

The embodiments of FIGS. 4, 5, and 6 illustrate filter assemblies wherein the filter cartridges are essentially in an upright or hanging position as distinguished from the inverted position illustrated in FIGS. 1 and 2. In the embodiments of FIGS. 4, 5, and 6 the closure members which are sealingly secured into the open ends of the pressure vessels are substantially the same as the closure member 42 shown in FIGS. 1, 2, and 3. Since the filter cartridges of FIGS. 4, 5, and 6, however, are in a hanging position securing means is provided to prevent the filter cartridge from becoming dislodged by gravity from its position in the head member. This securing means includes bayonet lugs formed on the closure member, which in the assembly coact with the head member and the bracket member to secure the filter cartridge in place and prevent dislodgement due to gravity. This bayonet lug means is substantially as described in our copending application Ser. No. 798,948 referred to above. The head member, of course, is mounted on a bracket member in an inverted position from that shown in FIGS. 1 and 2.

The filter assembly 110 shown in FIG. 4 includes a bracket member 112 for supporting a head member and a filter cartridge, a head member 114 secured to the bracket member 112 and a filter cartridge 116 which is inserted into and supported in the head member.

The bracket member 112 includes a generally laterally extending plate-like portion 120 with a substantially vertically extending integral portion 122 which may be removably attached to a supporting structure by suitable fastening means. A circular opening 124 is formed in the laterally extending portion 120 for receiving therethrough the upper end of the filter cartridge. A pair of oppositely disposed bayonet openings 125a and 125b are connected to the opening 124. The width A of opening 125a is narrower than width B of opening 125b for reasons to be subsequently explained.

The head member 114 is substantially similar to the head member 14 shown in FIGS. 1 and 2 but there are these differences. The lower end of bore 128 is enlarged at its lower end in the form of a counterbore 129 for the purpose of coacting with bayonet lugs on the closure member of the filter cartridge 116 as further described below.

In addition as distinguished from the head member of FIGS. 1 and 2 no alignment pin means is associated with the upper end wall 133 of head member 114 because alignment of the inlet and outlet ports of the closure member of the filter cartridge with the inlet and outlet ports formed in the head member is achieved by other means. A vent hole 138 is formed in the upper end wall 133 of the head member 114 to vent air and moisture from the head member when the filter cartridge is inserted into the head member.

The filter cartridge 116 of FIG. 4 includes a pressure vessel 40, a closure member 142, a filter septum 143 and a filter media 46 which is the same as the filter media shown in FIG. 1. The filter cartridge 116, just as the filter cartridge 16 of FIGS. 1 and 2, is designed to be an integral disposable unit which may be easily inserted into the head member 114 and removed therefrom by hand without the use of special tools. The same is true for the filter cartridge of FIGS. 5 and 6. The pressure vessels of FIGS. 4, 5, and 6 are identical to the pressure vessel 40 of FIGS. 1 and 2.

The closure member 142 is slightly different than the closure member 42 of FIGS. 1, 2, and 3 in the following respects. A pair of oppositely extending bayonet lugs 161a and 161b are formed on the exterior of cylindrical portion 150. Those lugs help to support the filter cartridge in the head member. When the filter cartridge is inserted into the head member, the cylindrical portion 150 of the closure member with its attached bayonet lugs must first pass through opening 124 and oppositely disposed bayonet openings 125a and 125b in the bracket member 112. As previously mentioned the bayonet openings 125a and 125b are of different sizes, one being narrower than the other. Likewise, the bayonet lugs are of correspondingly different sizes, one being narrower than the other so that the filter cartridge can be inserted into the head member in only one position to assure proper alignment of the inlet and outlet ports in the head member and closure member. The counterbore 129 in the lower end of the head member 114 is of a predetermined depth—substantially the same depth as the thickness of the bayonet lugs—and this together with the bracket member establishes the axial position of the closure member 142 in the head member 114.

O-ring seals 62, 64, and 66 disposed on the outer cylindrical surface of closure member 142 as shown in FIGS. 4, 5, and 6 occupy the same relative positions with respect to the inlet and outlet port means as they do in the embodiments of FIGS. 1 and 2.

After insertion into the head member, the filter cartridge 116 is rotated a quarter turn until the one side of each of the bayonet lugs 161a and 161b come to rest against stops 163a and 163b formed in the head member as shown in FIG. 10. Rotation of the filter cartridge to this position aligns the fluid inlet and outlet ports in the side wall of the closure member with the inlet and outlet ports in the head member. The bayonet lugs are secured between the bracket member 112 and the bottom of counterbore 129. Thus the bayonet lugs are effective through coaction with the stop means to align the fluid port means and are further effective to position the closure member in the head member against axial movement thus preventing the filter cartridge from becoming dislodged as a result of gravity forces.

In the FIG. 4 embodiment a tubular screen strainer 178 is associated with the fluid inlet passage 54, the upper end of the strainer 178 being attached to the closure member by some appropriate well-known means.

The filter means used in the filter cartridge includes the filter septum 143 which may be made of a woven material. It is disposed near the bottom of the pressure vessel and is attached to the outlet passage 52 by a tube 180 which in turn is attached to the closure member and forms part of the outlet passage 52. The filter means also may include a filter media 46 which may fill up all of the pressure vessel. The filter media preferrably is a granular activated carbon. Therefore, when influent enters the inlet 32 and proceeds through inlet passage 54 it moves through the filter media 46, then through the collector or filter septum 143, into tube 180 and out through the outlet passage 52 and outlet port 30.

The insertion and removal of the disposable filter cartridge into and from the system is a simple task. Since influent, usually water, is supplied to the system under pressure, a shut-off valve (not shown) usually will be provided in the inlet line somewhere upstream from the inlet port. This valve is shut off during installation or replacement of a filter cartridge into the system. With the shut-off valve closed the filter cartridge is inserted into the head member by lining up the bayonet lugs 161a and 161b with the appropriate size bayonet openings 125a and 125b. Once properly lined up the filter cartridge is inserted into the head member until the bayonet lugs contact the shoulder 182 and then turned a quarter turn until the bayonet lugs contact the stops 163a and 163b. Opening the shut-off valve again places the system in operation.

The embodiments shown in FIGS. 5 and 6 are substantially the same as that of FIG. 4, the only difference being the type of filter means used. In FIG. 5, for example, the use of a folded or pleated filter septum 184 is illustrated. Powdered filter media 185 also at least partially fills the pressure vessel 40. The filter media could be finely powdered carbon and/or other well known powdered filter media. The septum 184 is connected to and supported on a septum support tube 186 which is connected to passage 54. The tube 186 thus functions both as a septum support and as an outlet tube from the septum 184 to carry filtered fluid from the septum 184 through inlet 188 in support tube 186 and then to passage 54. In this embodiment the inlet and outlet passages in the head member and closure member are reversed from that shown in FIG. 4. An inlet tube 190 is connected to passage 52 of the closure member and extends down through the filter septum 184 to the bottom of the pressure vessel. A check valve 192, which may be of the flapper type, is connected to the lower end of inlet tube 190. Inlet fluid, therefore, passes downwardly through tube 190, check valve 192 and the powdered filter media 185, through the filter septum 184, through support tube 186 and out through passage 54 and outlet port 32.

In the embodiment of FIG. 6 the filter means is of the same type as shown in FIG. 2. The embodiment of FIG. 6 is essentially the same as the embodiment shown in FIG. 2 but turned upside down thus requiring the bayonet lug supporting means as do the embodiments of FIGS. 4 and 5. Inlet fluid enters at port 32, proceeds through passage 54 down into the pressure vessel, radially inwardly through filter unit 74 as indicated by the arrows, into passage 76 and out through passage 52 and outlet port 30.

While certain preferred embodiments of the invention have been disclosed, it will be appreciated that these are shown by way of example only, and the invention is not to be limited thereto as other variations will be apparent to those skilled in the art and the invention is to be given its fullest interpretation within the terms of the following claims.

What is claimed is:

1. A filter assembly comprising:
   (a) a bracket member adapted to be supported on a supporting structure, (b) a head member attached to said bracket member for receiving a filter cartridge therein, said head member comprising,
a cylindrical cup-like structure formed with an annular bore and having inlet and outlet ports in the cylindrical wall thereof and adapted to have a filter cartridge secured therein,
(c) a filter cartridge including
(1) a pressure vessel closed at one end,
(2) a closure member sealingly disposed in the open end of said pressure vessel, said closure member including,
(a) an annular base portion which is fitted onto and secured onto the open end of said pressure vessel,
(b) an elongated cylindrical portion formed integrally with said base portion and adapted to be inserted into said head member in sealing engagement therewith,
(c) a pair of axially extending inlet and outlet passages formed in said elongated cylindrical portion,
(1) one of said passages being formed with a first communicating port in the cylindrical wall of said cylindrical portion,
(2) the other of said passages being formed with a second communicating port in the cylindrical wall of said cylindrical portion,
(3) said first and second communicating ports being in fluid communication with the inlet and outlet ports of said head member, and
(3) filter means disposed within said pressure vessel between the inlet to and outlet from said pressure vessel.

2. The filter assembly of claim 1 including three O-ring seal disposed on the cylindrical wall of said closure member in such manner as to separate the inlet port with its associated inlet passage from the outlet port with its associated outlet passage and further to seal the internal pressure from the surrounding atmosphere when the closure member is inserted into said head member.

3. The filter assembly of claim 2 including vent means formed in said head member.

4. The filter assembly of claim 2 including cooperative alignment means formed on said head member and on said closure member for properly aligning the inlet and outlet ports in said head member and closure member.

5. The filter assembly of claim 4 wherein said alignment means comprises cooperating pin and recess means associated with said head member and said closure member.

6. The filter assembly of claim 4 wherein said alignment means comprises a recess in the outer end of said closure member and cooperating pin means associated with said head member.

7. The filter assembly of claim 6 including vent means formed in said cooperating pin means.

8. The filter assembly of claim 2 wherein said head member is positioned with its open end facing upwardly, whereby the filter cartridge is supported in said head member by gravity.

9. The filter assembly of claim 1 including first, second, and third O-ring seals disposed on the cylindrical wall of said closure member, said first and third O-ring seals being disposed in such a manner as to seal off the internal pressure from the surrounding atmosphere in a system in which the filter assembly is disposed, said second O-ring seal being disposed between said first and third O-ring seals to separate the inlet port with its associated inlet passage from the outlet port with its associated outlet passage.

10. The filter assembly of claim 1 wherein said filter means includes a filter septum disposed in said pressure vessel, said filter septum being connected with the outlet passage in said closure member, and further including a filter media disposed in said pressure vessel and surrounding said filter septum.

11. The filter assembly of claim 10 wherein said filter media is a finely powdered material.

12. The filter assembly of claim 10 wherein said filter media is a mixture of more than one type of powdered materials, at least one of them being powdered activated carbon.

13. The filter assembly of claim 1 wherein said filter means includes a cylindrical filter cartridge disposed in said pressure vessel, said cartridge being connected to the outlet passage in said closure member.

14. The filter assembly of claim 1 including annular opening means formed in said bracket member for receiving said closure member of said filter cartridge therethrough, said opening means being formed with a pair of oppositely disposed bayonet openings, and
a pair of radially estending bayonet locking lugs formed on the outer surface of said closure member which are adapted to be aligned with said bayonet openings in said bracket member when said filter cartridge is inserted into or removed from said head member, said bayonet lockings lugs in the assembly being adapted to coact with said bracket member to secure the filter cartridge in the assembly and prevent its being released from the assembly.

15. In a filter assembly the combination comprising:
(a) a head member adapted to be disposed in a fluid conduit and adapted to have a filter cartridge inserted thereinto, said head member comprising a cup-like structure having an annular bore formed therein and inlet and outlet ports formed in the wall portion and communicating with said bore,
(b) a filter cartridge including
(1) a pressure vessel closed at one end,
(2) a closure member sealingly disposed in the open end of said pressure vessel, said closure member including,
(a) an annular base portion which is fitted onto and secured onto the open end of said pressure vessel,
(b) an elongated cylindrical portion formed integrally with said base portion and adapted to be inserted into said head member in sealing engagement therewith,
(c) a pair of substantially axially extending inlet and outlet passages formed in said elongated cylindrical portion,
(1) one of said passages being formed with a first communicating port in the cylindrical wall of said cylindrical portion,
(2) the other of said passages being formed with a second communicating port in the cylindrical wall of said cylindrical portion, (3) said first and second communicating ports being in fluid communication with the inlet and outlet ports of said head member, (d) cooperative alignment means on said head member and said closure member for aligning the inlet and outlet ports in said head member and corresponding ports in said closure member, (e) first, second, and third O-ring seals disposed on the cylindrical wall of said closure member, said first and third O-ring seals being disposed in such a manner as to seal off the internal pressure from the surrounding atmosphere in a system in which the filter assembly is disposed, said second O-ring seal being disposed between said first and third O-ring seals to separate the inlet port with its associated inlet passage from the outlet port with its associated outlet passage, and (3) filter means disposed within said pressure vessel between the inlet to and outlet from said pressure vessel.

16. The combination of claim 15 wherein said alignment means comprises cooperating pin and recess means associated with said head member and said closure member.

17. The combination of claim 15 wherein said alignment means comprises a recess in the outer end of said closure member and cooperating pin means associated with said head member.

18. The combination of claim 15 wherein said cooperative alignment means include circumferentially spaced stop means formed on said head member and radially extending lug means formed on said closure member for coacting with said circumferentially spaced stop means in the filter assembly.

19. The combination of claim 15 including vent means formed in said head member.

20. The combination of claim 15 wherein said filter means includes a filter media filling a substantial portion of the pressure vessel.

21. The combination of claim 20 wherein said filter media is a granular activated carbon.

22. The combination of claim 20 wherein said filter media is a finely powdered material.

23. The combination of claim 20 wherein said filter media is a mixture of more than one type of powdered materials, at least one of them being powdered activated carbon.

24. The combination of claim 15 wherein said filter means includes a filter septum disposed in said pressure vessel, said filter septum being connected with the outlet passage in said closure member, and further including a filter media disposed in said pressure vessel and surrounding said filter septum.

25. The combination of claim 15 wherein said filter means includes a cylindrical filter cartridge disposed in said pressure vessel said cartridge being connected to the outlet passage in said closure member.

* * * * *